United States Patent
Lapuh et al.

(10) Patent No.: US 7,173,934 B2
(45) Date of Patent: Feb. 6, 2007

(54) SYSTEM, DEVICE, AND METHOD FOR IMPROVING COMMUNICATION NETWORK RELIABILITY USING TRUNK SPLITTING

(75) Inventors: Roger Lapuh, Santa Clara, CA (US); Yili Zhao, Fremont, CA (US); Wassim Tawbi, Milpitas, CA (US); Joseph M. Regan, Pleasanton, CA (US); David Head, Livermore, CA (US)

(73) Assignee: Nortel Networks Limited (CA)

( * ) Notice: Subject to any disclaimer, the term of this patent is extended or adjusted under 35 U.S.C. 154(b) by 901 days.

(21) Appl. No.: 10/125,654

(22) Filed: Apr. 18, 2002
(Under 37 CFR 1.47)

(65) Prior Publication Data
US 2003/0097470 A1    May 22, 2003

Related U.S. Application Data

(60) Provisional application No. 60/318,427, filed on Sep. 10, 2001.

(51) Int. Cl.
*H04L 12/56* (2006.01)
*H04L 12/28* (2006.01)

(52) U.S. Cl. .................. 370/392; 370/220; 370/221

(58) Field of Classification Search ........ 370/219–221, 370/216–228
See application file for complete search history.

(56) References Cited

U.S. PATENT DOCUMENTS

| | | | | |
|---|---|---|---|---|
| 5,425,026 | A * | 6/1995 | Mori | 370/410 |
| 6,229,787 | B1 * | 5/2001 | Byrne | 370/218 |
| 6,301,224 | B1 * | 10/2001 | Rijhsinghani et al. | 370/227 |
| 6,347,073 | B1 * | 2/2002 | Hiscock et al. | 370/217 |
| 6,359,858 | B1 * | 3/2002 | Smith et al. | 370/217 |
| 6,757,279 | B1 * | 6/2004 | Furlong et al. | 370/387 |
| 2002/0012352 | A1 * | 1/2002 | Hansson et al. | 370/401 |

* cited by examiner

*Primary Examiner*—Chi Pham
*Assistant Examiner*—Ronald Abelson
(74) *Attorney, Agent, or Firm*—McGuinness & Manaras LLP (57) ABSTRACT

A multilink trunk from a client device in a communication network is split between two aggregation devices such that each aggregation device is connected to at least one link of the multilink trunk. The aggregation devices work in conjunction to appear to the client device as a single device connected to the client device over the multilink trunk. The aggregation devices transmit identical bridge protocol data units to the client device over their respective links of the multilink trunk. The aggregation devices exchange operational information and data packets over inter-device communication ports. A failure of the split multilink trunk at one aggregation device is restored through the other aggregation device.

47 Claims, 2 Drawing Sheets

SYSTEM, DEVICE, AND METHOD FOR IMPROVING COMMUNICATION NETWORK RELIABILITY USING TRUNK SPLITTING

PRIORITY

The present application claims priority from the U.S. Provisional Patent Application No. 60/318,427 filed on Sep. 10, 2001 in the names of Roger Lapuh, Yili Zhao, Wassim Tawbi, and Joe Regan, which is hereby incorporated herein by reference in its entirety.

FIELD OF THE INVENTION

The present invention relates generally to communication networking, and more particularly to improving communication network reliability by splitting a multilink trunk between two aggregation devices.

BACKGROUND OF THE INVENTION

In today's communication age, communication networks are being used ever more frequently for transporting data. As networks grow ever more critical, there is a demand for multiple paths from all edge devices in a network into the core of the network in order to eliminate all single points of failure. Moreover, it is highly desirable that the elimination of single points of failure not result in unused capacity (which is often very costly) and perhaps more important, that rerouting around failures be as fast as possible. This elimination of single points of failure and rerouting around failures should preferably be as transparent as possible to the edge devices and should preferably interoperate with existing edge devices with little or no modification of the edge devices.

SUMMARY OF THE INVENTION

In accordance with one aspect of the invention, a multilink trunk from a device in a communication network (referred to herein as a "client device") is split between two aggregation devices such that each aggregation device is connected to at least one link of the multilink trunk. The aggregation devices work in conjunction to appear to the client device as a single device connected to the client device over the multilink trunk. The aggregation devices transmit identical bridge protocol data units to the client device over their respective links of the multilink trunk. The aggregation devices exchange operational information and data packets over inter-device communication ports. A failure of the split multilink trunk at one aggregation device is restored through the other aggregation device.

DETAILED DESCRIPTION OF A PREFERRED EMBODIMENT

In an embodiment of the present invention, a trunk splitting technique (referred to hereinafter as Split Multilink Trunking or SMLT) is used to improve the reliability of a layer 2 network. A typical layer 2 network of an embodiment of the present invention operates within a single building, although this is not to be considered a limitation of the present invention. The trunk splitting technique of the present invention typically operates between client device, such as a network edge switch (ES), and two network center aggregation switches (AS), for example, within a single building. The trunk splitting technique of the present invention provides redundant paths and redundant aggregation switches to provide rapid fault detection and forwarding path modification.

For purposes of the following discussion, an ES is a switch that is located at the edge of the network to which end stations are directly or indirectly (e.g., through a hub or switch) connected. An AS is a switch that connects to multiple wiring closet switches, typically within a single building. A multilink trunk (MLT) is a communication channel having multiple parallel point-to-point communication links, and can be based upon any statically provisioned link aggregation scheme (e.g., 802.3ad running statically). A split multilink trunk (SMLT) is a multilink trunk (MLT) having one end that is split between two aggregation switches. An Inter Switch Trunk (IST) is one or more parallel point-to-point communication links that connect two aggregation switches together and is used by the two aggregation switches for communication so that the two aggregation switches can operate as a single logical switch.

Figure 1:
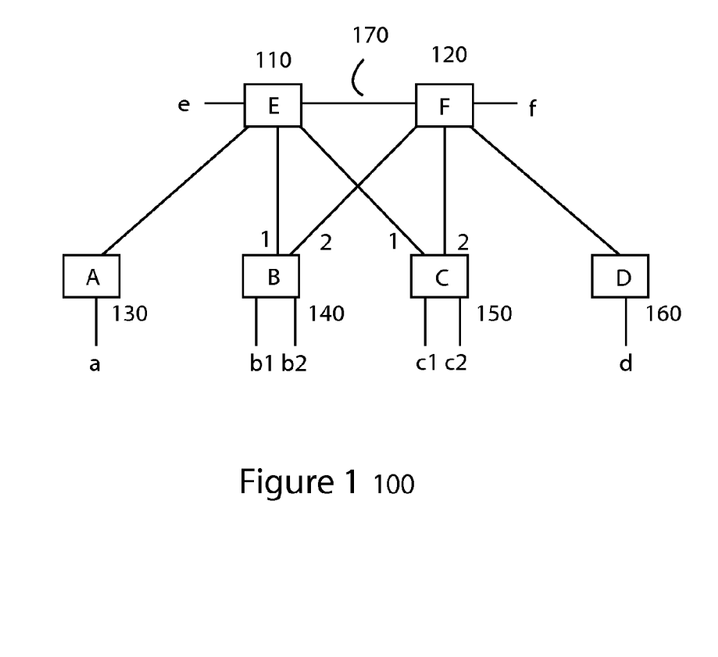
FIG. 1 is a block diagram showing an exemplary layer 2 network in accordance with an embodiment of the present invention.

FIG. 1 shows an exemplary layer 2 network 100 in accordance with an embodiment of the present invention. Among other things, the layer 2 network 100 includes two aggregation switches, namely AS E 110 and AS F 120, four network edge switches, namely ES A 130, ES B 140, ES C 150, and ES D 160, and end stations a, b1, b2, c1, c2, d, e, and f. The ES B 140 is connected to the AS E 110 and to the AS F 120 via a MLT that is split between the two aggregation switches (i.e., by a SMLT). For example, ES B 140 may use two parallel links for its connection to the AS E 110 and may use two additional parallel links for its connection to the AS F 120. Likewise, the ES C 150 is connected to the AS E 110 and to the AS F 120 via a MLT that is split between the two aggregation switches (i.e., by a SMLT). ES C 150 may use two parallel links for its connection to the AS E 110 and may use two additional parallel links for its connection to the AS F 120. Network edge switches A 130 and D 160 may use MLTs for their connections to the aggregation switches E 110 and F 120, but their MLTs are not split between the aggregation switches E 110 and F 120. The end stations a, b1, b2, c1, c2, and d might be clients or printers. The end stations e and f might be servers or routers.

Within the layer 2 network 100, a spanning tree technique is typically used to determine forwarding paths. With regard to the spanning tree topology of the layer 2 network 100, aggregation switches E 110 and F 120 are combined to operate as a single logical node of the spanning tree so that aggregation switches E 110 and F 120 behave as if they were a single logical node in the network. The aggregation switches E 110 and F 120 are tied directly together by an IST 170. The IST 170 is used for exchanging Media Access Control (MAC) information and forwarding data packets between the aggregation switches E 110 and F 120 using an IST protocol (described below).

In a typical embodiment of the present invention, the assignment of switch ports to an MLT (or SMLT) is manually configured on the two switches at each end of an MLT (or SMLT), although the present invention is not limited to such manual configuration.

A SMLT is handled like any other MLT at the ES. The ES is unaware that the MLT is split at the AS side. A normal MLT port type is the only port configuration type that is required to support SMLT. The ES is not required to do anything special to support SMLT, since the ES is unaware that the MLT is split between two aggregation switches.

A SMLT is handled specially at each AS. SMLT requires new port types to be supported by the aggregation switches. These are not physical port types, but rather are logical port types.

An SMLT logical port type refers to one half of an ES MLT that is split between two aggregation switches. For each SMLT on one AS, there is a corresponding SMLT on the other AS. An SMLT might map to one or more physical ports of the AS. An exemplary embodiment of the present invention limits the number of ports in an MLT to eight ports, although this should not be considered a limitation of the present invention.

An IST logical port type refers to one end of a communication channel that connects two aggregation switches that are configured to support SMLTs. An IST might map to one or more physical ports of the AS. The two aggregation switches communication with one another through the IST logical port using the IST protocol. Certain packet traffic is also forwarded between the aggregation switches over the IST logical ports.

The switches at either end of an MLT transmit various bridge protocol data units (BPDU) over the MLT link connections. BPDUs are data messages that are exchanged across the switches within an extended LAN that uses a spanning tree protocol topology. BPDU packets contain information on ports, addresses, priorities, and costs and ensure that the data ends up where it was intended to go. BPDU messages are exchanged across bridges to detect loops in a network topology. The loops are then removed by shutting down selected bridge interfaces and placing redundant switch ports in a backup, or blocked, state. It should be noted that spanning tree is not required for the present invention, but allows for interoperability within a spanning tree environment.

One BPDU parameter is the bridge identifier. Bridges generally use an eight byte bridge identifier in the BPDUs, as defined in 802.1D. Per supplement P802.1t/D2, the four most significant bits of the most significant byte are a settable priority, and the next twelve bits are a system identifier extension. The remaining six bytes are set to the MAC address that is assigned to the bridge (i.e., the bridge address).

Another BPDU parameter is root path cost. Bridges typically use a four byte value to specify their path cost to the root bridge.

Another BPDU parameter is port identifier. Bridges typically use a two byte port identifier in the BPDUs, as defined in 802.1D. Per supplement P802.1t/D2, the four most significant bits of the most significant byte are a settable priority, and the remaining twelve bits are the port number.

When the switch at either end of an MLT transmits a spanning tree BPDU on the MLT, it is required to transmit identical copies of the BPDU on each link that is assigned to the MLT. The transmission of BPDUs on each link permits the switches to confirm that the MLT is properly connected between the two switches (i.e., that all links of the MLT are connected between the same two switches). The port identifier parameter of configuration BPDUs is set to the port identifier of the highest priority port that is configured to belong to the MLT on the designated bridge (i.e., typically the port identifier with the lowest numerical value), even if it is determined that the port is not operational.

When a SMLT is established between an ES and two aggregation switches, the ES will receive some BPDUs from one AS and some BPDUs from the other AS. Because the ES does not know that its MLT is split, it expects to receive identical BPDUs over all SMLT links, and would generally shut down the MLT if it received different BPDUs on different MLT links. Thus, the two aggregation switches must generate and transmit identical BPDUs for each of its shared SMLTs, including identical bridge identifiers, root path costs, and port identifiers.

In order for the two aggregation switches to generate and transmit identical BPDUs for a particular SMLT, the two aggregation switches negotiate or otherwise select common BPDU values at start-up time. For the bridge identifier BPDU value, the aggregation switches typically use the one that has higher priority (i.e., typically the lower numerical value) for BPDUs that are transmitted on all SMLT links. For the root path cost BPDU value, the aggregation switches typically use the root path cost of the AS having the higher priority bridge identifier for BPDUs that are transmitted on all SMLT links. For the port identifier BPDU value, the aggregation switches typically use the highest priority port identifier (i.e., typically the lowest numerical value) of the AS having the highest priority bridge identifier for BPDUs that are transmitted on all SMLT links.

It should be noted that if one of the two aggregation switches fails, then the surviving AS continues to use these BPDU values for BPDUs that are transmitted on its SMLT links. Consequently, the failure of one AS appears to the ES as nothing more than the failure of the MLT links that connect it to the failed AS.

It should be noted that the problem of generating identical BPDUs by two aggregation switches is limited to SMLTs. The other (non-SMLT) ports of the two aggregation switches generate their BPDUs in the usual manner, using the bridge identifier, root path cost, port identifier, and other parameters of the switch to which the port belongs.

The proper operation of SMLT requires that certain conditions (described below) be satisfied. The spanning tree protocol is principally used to confirm that those restrictions have been satisfied, and to prevent loops that result from inadvertent installation of links in the wrong places. SMLT redundancy is provided so that a single point of failure does not require a spanning tree protocol topology change, which is inherently slow.

One condition is that the two aggregation switches have equal bridge priorities that should be higher than the bridge priority of any ES connected to the aggregation switches via a SMLT. If an ES were to become the root of the spanning tree and a link was inadvertently established between that and another ES, the SMLT could become blocked by the spanning tree protocol.

Another condition is that, if the aggregation switches do not have the highest bridge priority of all switches in the bridged LAN, then the aggregation switches should have a root path cost that is less than that of any of the network edge switches. For example, if one of the SMLTs connects the aggregation switches to a campus center switch that has a higher bridge priority, and an ES also has a direct connection to the campus center switch, then it must have a path cost to the campus switch that gives it a higher root path cost.

Another condition is that the IST port of the higher priority AS be configured to have the lowest priority and largest number of root path cost compared with the other ports in the spanning tree group.

Another condition is that the IST port of the lower priority AS be configured to have the highest priority and smallest number of root path cost compared with the other ports in the spanning tree.

The network edge switches can use any method for determining which link of their SMLT connections to use for forwarding a packet, so long as the same link is used for a given destination address (DA) and source address (SA) pair, regardless of whether or not the DA is known by the network edge switches. In the exemplary layer 2 network 100, the ES B 140 uses its link 1 for all packets received from end station b1 and uses its link 2 for all packets received from end station b2. Similarly, the ES C 150 uses its link 1 for all packets received from end station c1 and uses its link 2 for all packets received from end station c2.

The network edge switches typically perform standard 802.1D MAC address learning and aging. As described above, each ES believes that it is connected to a single AS, even when a SMLT is used.

The network edge switches typically perform standard 802.1D forwarding. Packets that are forwarded by an ES to its MLT are distributed to individual member links of the MLT on the basis of the port from which the packet was received. In the case of an ES with a SMLT, packets on different ports will be sent to different aggregation switches. Therefore, each AS will receive packets from a subset of the ES ports. Thus, in the exemplary layer 2 network 100, AS E 110 will receive from ES B 140 only packets from end user b1, while AS F 120 will receive from ES B 140 only packets from end user b2. Likewise, AS E 110 will receive from ES C 150 only packets from end user c1, while AS F 120 will receive from ES C 150 only packets from end user c2.

The aggregation switches maintain certain information for each link connection to an ES. Of particular relevance to the present invention, each AS maintains an indicator for each link connection indicating whether or not the link connection belongs to a SMLT. Each SMLT is associated with a unique SMLT identifier (ID) that is common to both aggregation switches to which it is associated. Each AS maintains the SMLT ID for each of its SMLTs.

The aggregation switches typically perform standard 802.1D learning and aging for packets received on all of their ports, except those received over the IST. Thus, each AS learns the address of its directly connected end stations, the addresses of all end stations associated with network edge switches connected to the AS through a MLT, and the addresses of a subset of end stations associated with network edge switches connected to the AS through a SMLT. Thus, in the exemplary layer 2 network 100, the AS E 110 learns the address of its directly connected end station e, the address of end station a, the address of end station b1, and the address of end station c1, while the AS F 120 learns the address of its directly connected end station f, the address of end station d, the address of end station b2, and the address of end station c2.

The aggregation switches include address sharing logic for exchanging learned and aged MAC address with one another over the IST using an IST protocol (described below). The IST ports of the aggregation switches are configured using the IST logical port type. The IST might map to one or more physical ports of the AS. The IST ports of the aggregation switches do not have spanning tree port states associated with them.

When an AS learns a MAC address from a particular ES over a SMLT, the learning AS creates a MAC table entry for the learned MAC address associating the learned MAC address with the link connection and ES from which the MAC address was learned. The learning AS also sends the learned MAC address along with the SMLT ID to the other AS (referred to hereinafter as the "remote" AS to distinguish it from the "learning" AS) over the IST using the IST protocol. Upon receiving a learned MAC address from the learning AS over the IST using the IST protocol, the remote AS creates a MAC table entry for the learned MAC address associating the learned MAC address with the SMLT associated with the ES from which the MAC address was learned based upon the SMLT ID. Thereafter, when the remote AS receives a packet that is destined for that learned MAC address, the remote AS forwards the packet directly to the ES over its SMLT link connection to the ES.

In the exemplary layer 2 network 100, when the AS E 110 learns MAC address b1 from the SA of a packet received from ES B 140 over its SMLT to ES B 140, it creates a MAC table entry for MAC address b1 associating MAC address b1 with its SMLT link connection to the ES B 140. The AS E 110 also sends MAC address b1 along with the appropriate SMLT ID to AS F 120 over the IST 170 using the IST protocol. Upon receiving the MAC address b1 from AS E 110 over the IST using the IST protocol, the AS F 120 creates a MAC table entry for MAC address b1 associating MAC address b1 with its SMLT link connection to the ES B 140. Thereafter, when the AS F 120 receives a packet that is destined for MAC address b1, the AS F 120 forwards the packet directly to ES B 140 over its SMLT link connection to ES B 140.

In the exemplary layer 2 network 100, when the AS E 110 learns MAC address c1 from the SA of a packet received from ES C 150 over its SMLT to ES C 150, it creates a MAC table entry for MAC address c1 associating MAC address c1 with its SMLT link connection to the ES C 150. The AS E 110 also sends MAC address c1 along with the appropriate SMLT ID to AS F 120 over the IST 170 using the IST protocol. Upon receiving the MAC address c1 from AS E 110 over the IST using the IST protocol, the AS F 120 creates a MAC table entry for MAC address c1 associating MAC address c1 with its SMLT link connection to the ES C 150. Thereafter, when the AS F 120 receives a packet that is destined for MAC address c1, the AS F 120 forwards the packet directly to ES C 150 over its SMLT link connection to ES C 150.

In the exemplary layer 2 network 100, when the AS F 120 learns MAC address b2 from the SA of a packet received from ES B 140 over its SMLT to ES B 140, it creates a MAC table entry for MAC address b2 associating MAC address b2 with its SMLT link connection to the ES B 140. The AS F 120 also sends MAC address b2 along with the appropriate SMLT ID to AS E 110 over the IST 170 using the IST protocol. Upon receiving the MAC address b2 from AS F 120 over the IST using the IST protocol, the AS E 110 creates a MAC table entry for MAC address b2 associating MAC address b2 with its SMLT link connection to the ES B 140. Thereafter, when the AS E 110 receives a packet that is destined for MAC address b2, the AS E 110 forwards the packet directly to ES B 140 over its SMLT link connection to ES B 140.

In the exemplary layer 2 network 100, when the AS F 120 learns MAC address c2 from the SA of a packet received from ES C 150 over its SMLT to ES C 150, it creates a MAC table entry for MAC address c2 associating MAC address c2 with its SMLT link connection to the ES C 150. The AS F 120 also sends MAC address c2 along with the appropriate SMLT ID to AS E 110 over the IST 170 using the IST protocol. Upon receiving the MAC address c2 from AS F 120 over the IST using the IST protocol, the AS E 110 creates a MAC table entry for MAC address c2 associating MAC address c2 with its SMLT link connection to the ES C 150. Thereafter, when the AS E 110 receives a packet that is destined for MAC address c2, the AS E 110 forwards the packet directly to ES C 150 over its SMLT link connection to ES C 150.

Each of the aggregation switches performs aging for MAC addresses in its MAC table. Aging is used to remove MAC addresses that have not been used for some period of time from the MAC tables. In a typical embodiment of the present invention, a MAC address associated with a SMLT is removed by both aggregation switches when either one of the aggregation switches considers the MAC address to be aged. Therefore, when one AS determines that a MAC address has aged locally, it removes the MAC address from its MAC table and notifies the other AS over the IST using the IST protocol, which in turn removes the MAC address from its MAC table.

For example, in the layer 2 network 100, both the AS E 110 and the AS F 120 maintain MAC address b1. Assuming the AS E 110 determines that MAC address b1 is aged, the AS E 110 removes MAC address b1 from its MAC table and notifies the AS F 120 that MAC address b1 is aged, which in turn removes MAC address b1 from its MAC table.

In an alternate MAC address aging scheme, each AS removes a particular MAC address only when both aggregation switches consider the MAC address to be aged. Such an aging scheme requires additional coordination between the two aggregation switches (e.g., a special IST message to indicate that a MAC address has been aged but not necessarily removed) as well as additional logic for maintaining the status of a MAC address (e.g., whether the MAC address has been aged by one AS but not the other AS).

During normal operation, the two aggregation switches associated with a SMLT handle packet forwarding as if the two aggregation switches were a single switch that terminates the MLT from the ES.

When an AS receives a packet from a non-IST port, the AS searches its MAC table for the destination MAC address. If the AS finds the destination MAC address in its MAC table, then the AS forwards the packet according to the MAC table entry. If the AS does not find the destination MAC address in its MAC table, however, then the AS forwards the packet to all directly connected devices other than the device from which the packet was received, including any directly connected end stations, any directly connected network edge switches, and the other AS.

When an AS receives a packet from the IST port, the AS searches its MAC table for the destination MAC address. If the AS finds the destination MAC address in its MAC table, then the AS determines whether the destination MAC address is associated with an active dual-homed SMLT link (i.e., a link that is associated with an SMLT that has at least one active link to each AS). If the AS determines that the destination MAC address is associated with an active dual-homed SMLT link, then the AS does not forward the packet (i.e., the AS drops the packet). If the AS does not find the destination MAC address in its MAC table or the AS determines that the destination MAC address is not associated with an active dual-homed SMLT link, however, then the AS forwards the packet to all ports that are not associated with an active dual-homed SMLT port or the IST port.

The following are descriptions of some exemplary packet forwarding paths between various combinations of end stations connected to network edge switches and aggregation switches. The symbol "!●" is used to denote a forwarding decision based upon a known destination MAC address. The symbol "?●" is used to denote a forwarding decision based upon an unknown destination MAC address. The symbol "X" is used to denote a packet drop decision. It should be noted that all switches are presumed to know the "all ones" broadcast address. It should also be noted that a switch typically does not forward a packet back to the switch or device from which it was received.

The following is a forwarding decision tree for forwarding a packet from end station a to end station b1:

The following is a forwarding decision tree for forwarding a packet from end station a to end station c2:

The following is a forwarding decision tree for forwarding a packet from end station a to end station d:

The following is a forwarding decision tree for forwarding a packet from end station a to end station e:

The following is a forwarding decision tree for forwarding a packet from end station a to all end stations using a destination MAC address equal to the "all ones" broadcast address:

```
a   •  A  •  E  ! •  e
             E  ! •  B  ! •  b1, b2
             E  ! •  C  ! •  c1, c2
             E  ! •  F  ! •  f
                     F  ! •  D       ! •  d
```

The following is a forwarding decision tree for forwarding a packet from end station b1 to end station a:

```
b1  •  B  •  E  ! •  A  ! •  a
                     A  ? •  a
             E  ? •  e
             E  ? •  A  ! •  a
                     A  ? •  a
             E  ? •  C  ! •  χ
                     C  ? •  c1, c2
             E  ? •  F  ! •  χ
                     F  ? •  f
                     F  ? •  D       ! •  χ
                             D       ? •  d
```

The following is a forwarding decision tree for forwarding a packet from end station b1 to end station c2:

```
b1  •  B  •  E  ! •  C  ! •  c2
                     C  ? •  c1, c2
             E  ? •  e
             E  ? •  A  ! •  χ
                     A  ? •  a
             E  ? •  C  ! •  c2
                     C  ? •  c1, c2
             E  ? •  F  ! •  χ
                     F  ? •  f
                     F  ? •  D       ! •  χ
                             D       ? •  d
```

The following is a forwarding decision tree for forwarding a packet from end station b1 to end station e:

```
b1  •  B  •  E  ! •  e
             E  ? •  e
             E  ? •  A  ! •  χ
                     A  ? •  a
             E  ? •  C  ! •  χ
                     C  ? •  c1, c2
             E  ? •  F  ! •  χ
                     F  ? •  f
                     F  ? •  D       ! •  χ
                             D       ? •  d
```

The following is a forwarding decision tree for forwarding a packet from end station b1 to end station f:

```
b1  •  B  •  E  ! •  F  ! •  f
                     F  ? •  f
                     F  ? •  D       ! •  χ
                             D       ? •  d
             E  ? •  e
             E  ? •  A  ! •  χ
                     A  ? •  a
             E  ? •  C  ! •  χ
                     C  ? •  c1, c2
             E  ? •  F  ! •  f
                     F  ? •  f
                     F  ? •  D       ! •  χ
                             D       ? •  d
```

The following is a forwarding decision tree for forwarding a packet from end station b1 to all end stations using a destination MAC address equal to the "all ones" broadcast address:

```
b1  •  B  •  E  ! •  e
             E  ! •  A  ! •  a
             E  ! •  C  ! •  c1, c2
             E  ! •  F  ! •  f
                     F  ! •  D       ! •  d
```

The following is a forwarding decision tree for forwarding a packet from end station b2 to end station a:

```
b2  •  B  •  E  ! •  A  ! •  a
                     A  ? •  a
             E  ? •  e
             E  ? •  A  ! •  a
                     A  ? •  a
             E  ? •  C  ! •  χ
                     C  ? •  c1, c2
             E  ? •  F  ! •  χ
                     F  ? •  f
                     F  ? •  D       ! •  χ
                             D       ? •  d
```

It should be noted that the AS F 120 does not forward packets received from the AS E 110 to either the ES B 140 or the ES C 150, since the AS F 120 is connected to those network edge switches via SMLTs.

The switches at each end of an MLT (or SMLT) rely upon media dependent mechanisms, such as auto-negotiation and far end fault detection and indication, to detect problems that might occur on one of the links of an MLT (or SMLT). When a link is found to be bad, the switches as each end of the MLT remove it from the MLT (or SMLT).

The aggregation switches and the network edge switches typically use whatever media-dependent mechanisms are available to monitor link integrity, such as auto-negotiation and far end fault detection and indication. These may provide the most immediate indication of a link failure. When a failure is detected by a link receiver, the link transmitter for the same port signals a link failure to the far end link receiver.

The network edge switches make no distinction between MLTs and SMLTs. When any link that belongs to an MLT or SMLT fails, the ES must quickly detect the link failure and migrate all of the flows (end station ports) from the failed link to other links that belong to the same MLT/SMLT.

When any link that belongs to a SMLT fails, the AS must quickly detect the link failure and migrate all of its flows that were assigned to the failed link over to other links that belong to the same half of the SMLT.

If there are no other links that belong to the same half of the SMLT, then communication between the ES and the AS is restored through the other AS. Specifically, the affected AS notifies the other AS of the SMLT failure via the IST using the IST protocol, and re-maps the flows that were previously assigned to the SMLT over to its IST port so that future packets destined for the ES will then be forwarded to the other AS over the IST. The other AS changes its corresponding SMLT ports from the SMLT logical port type to the MLT logical port type so that the ports are no longer considered to be SMLT ports but rather are considered to be regular MLT ports. When the affected AS receives a packet destined for the ES, the packet is forwarded to the other AS over the IST due to the re-mapping of the flows over to the IST port. The other AS will now forward the packet it receives from its IST port to the ES over the former SMLT ports, since those SMLT ports are now just MLT ports. Thus, communication between the affected AS and the ES is quickly restored through the other AS.

For example, in the layer 2 network 100, if the SMLT links from ES B 140 to AS E 110 fail, then AS E 110 notifies the AS F 120 of the SMLT failure via the IST using the IST protocol, and then re-maps the MAC addresses that were previously assigned to the E-B SMLT over to its IST port so that future packets destined for the ES are forwarded to the AS F 120 over the IST 170. AS F 120 in turn changes its F-B SMLT ports to the MLT logical port type so that the ports are no longer considered to be SMLT ports. Thereafter, when the AS E 110 receives a packet destined for the ES B 140, the AS E 110 forwards the packet to the AS F 120 over the IST 170. Upon receiving the packet from the AS E 110 over the IST 170, the AS F 120 forwards the packet to the ES B 140 over its MLT to the ES B 140.

When one of the two aggregation switches fails, each ES will detect the failure by way of media-dependent mechanisms and/or the spanning tree protocol on the links that connect the ES to the failed AS. Each ES will respond just as for a link failure, by migrating all of the flows (end station ports) that were assigned to the failed link(s), over to the remaining good links that belong to the same MLT.

An AS detects the failure of its companion AS by its failure to participate in the IST protocol. The surviving AS need not make any changes to its forwarding behavior after detecting such a failure. The only connectivity that is lost is connectivity with any devices that are connected solely with the failed AS. If it is the high priority AS that fails, then the low priority AS needs to continue the generation of configuration BPDUs for its SMLT ports, and it must continue to use the same values for the BPDU parameters, including the bridge ID and port ID values of the now failed high priority aggregation switch.

An IST failure is difficult to handle. Each AS can use media-dependent mechanisms (such as auto-negotiation and far end fault detection and indication) and the IST protocol to monitor the health of the IST connection between the two aggregation switches. It is difficult, however, to distinguish between a failure of the other AS from a failure of the IST connection. This need to distinguish between the two types of failures can be avoided through a course of action for a surviving AS that does not depend on the type of failure. As described above, when the high priority AS fails, the surviving AS must continue to generate and send BPDUs down its half of the SMLT to the ESs (and continue to use the high priority bridge ID). However, if the IST fails and the high priority AS is still operating, then the problem becomes one of how to maintain consistent knowledge of the root bridge ID, root path cost, and other parameters for the BPDUs generated by the two aggregation switches. Failure to maintain that consistency will result in non-identical BPDUs on the two halves of a SMLT, and the affected ES will respond by shutting down the entire MLT. This problem can be avoided by requiring that two or more links be used to implement the IST connection between the two aggregation switches. That way, there is not a single point of failure that can disrupt the IST.

As described above, the IST is used for exchanging Media Access Control (MAC) information and forwarding data packets between two aggregation switches using an IST protocol. The IST protocol includes a number of different message types.

One IST message type is an IST Hello message. The aggregation switches transmit period IST Hello messages to one another across the IST. The IST Hello messages are essentially used to verify connectivity between the aggregation switches across the IST. An IST Hello message indicates (1) that the AS port from which the IST Hello message is being sent is configured as an IST port; (2) whether or not the sending port is receiving IST Hello messages from the other end; and (3) the expected time interval between IST Hello messages that are received from the other end.

Yet another IST message type is an IST "notification of learned or migrated MAC addresses" message. When an AS learns a new MAC address on any of its ports, it notifies the other AS using this message type. It supplies the MAC address value, and also supplies the type of port at which the address was learned (i.e., SMLT port or "other" port). If the address was learned on a SMLT port, the SMLT ID is passed with the learned address to the other AS. If the address was learned on any port other than a SMLT port, no port identification is passed with the learned address. When an AS receives an IST "notification of learned or migrated MAC address" message, it checks whether it already has a record for the address. If not, it creates a record. If it already has a record, it checks its port assignment, and updates the port assignment if necessary. When an AS performs a SA lookup for a received packet and discovers that the address has migrated from an SMLT port to a non-SMLT port (or vice versa), it updates its MAC table entry accordingly, and sends an IST "notification of learned or migrated MAC address" message to the other AS. The other AS responds by changing its MAC table entry from the SMLT port to the IST port (or vice versa).

Another IST message type is an IST "notification of MAC address aged out" message. When the age expires for a MAC address, the AS deletes the MAC table entry, and sends an IST "notification of MAC address aged out" message to the other AS to report the event. The other AS responds by deleting its record for the same MAC address.

Another IST message type is a Spanning Tree Information message. This message includes bridge ID, rootpath cost, port ID, and other information. This message is sent by an AS to notify the other AS of the value of its own bridge ID. This permits each AS to compare its ID with the other's bridge ID so that the aggregation switches can determine which will be the root bridge, and can also determine the values of BPDU parameters used on the SMLTs.

The IST protocol may also support additional messages for communicating such things as a deleted MAC address, a copy of the MAC address table, spanning tree information, and IGMP information, to name but a few.

Figure 2:
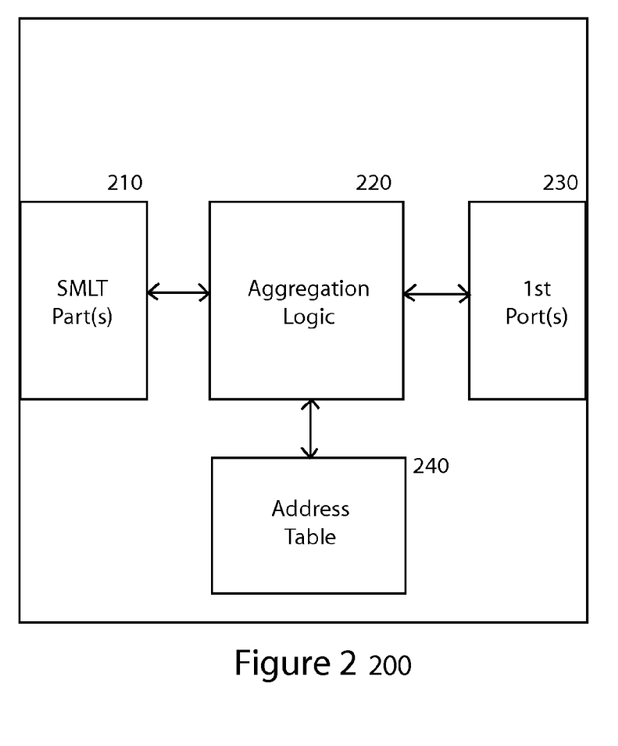
FIG. 2 is a block diagram showing the relevant components of an exemplary aggregation device in accordance with an embodiment of the present invention.

FIG. 2 is a block diagram showing the relevant components of an exemplary aggregation device 200 in accordance with an embodiment of the present invention. Among other things, the aggregation device 200 includes SMLT port(s) 210, aggregation logic 220, IST port(s) 230, and MAC table 240.

The aggregation logic 220 communicates with the edge device over the split multilink trunk via the SMLT port(s) 210. The aggregation logic 220 communicates with the other aggregation device over the communication between the two aggregation devices via the IST port(s) 230. The aggregation logic 220 maintains address information in the address table 240. The aggregation logic 220 works in conjunction with the other aggregation device so that the two aggregation devices appear to the edge device as a single device coupled to the edge device through the multilink trunk. The aggregation logic 220 typically configures each SMLT port as a split multilink trunk logical port type. The aggregation logic 220 typically maintains a unique identifier for the split multilink trunk and uses the unique identifier to identify the split multilink trunk in communication with the other aggregation device.

The aggregation logic 220 typically establishes the communication connection for communicating with the other aggregation device and exchanges information with the other aggregation device over the communication connection. The aggregation logic 220 typically negotiates with the other aggregation device to determine values for each of a number of bridge protocol data unit (BPDU) parameters and transmits substantially identical bridge protocol data unit (BPDU) messages as the other aggregation device to the edge device over its links of the split multilink trunk. When the aggregation logic 220 learns an address, it typically maintains the address in the address table 240 and sends the learned address to the other aggregation device over the communication connection via the IST port(s) 230.

The aggregation logic 220 performs packet forwarding as described above. The aggregation logic 220 uses the address table 240 to make forwarding decisions based upon, among other things, the MAC address in the packet and the port over which the packet was received.

The aggregation logic 220 performs MAC address aging as described above.

The aggregation logic 220 typically monitors the links of the split multilink trunk. Upon determining that all links of the split multilink trunk have failed, the aggregation logic 220 typically sends a message to the other aggregation device indicating a split multilink trunk failure and re-maps all flows associated with the split multilink trunk to the IST port(s) 230 so that all packets previously destined for its split multilink trunk are forwarded to the other aggregation device over the communication connection.

If the aggregation logic 220 receives a message from the other aggregation device over the communication connection indicating that its split mulilink trunk has failed, then the aggregation logic 220 typically reconfigures each SMLT port from a split multilink trunk logical port type to a multilink trunk logical port type so that the ports are thereafter handled as regular multilink ports (as opposed to split multilink ports).

It should be noted that the SMLT technique of the present invention provides a number of significant advantages over a typical spanning tree technique.

One advantage of the SMLT technique over a spanning tree technique is that the SMLT technique provides for load sharing. An SMLT essentially creates two pathways to a particular ES, one through each of the two aggregation switches. Since a spanning tree technique does not allow multiple pathways to any device (and in fact seeks to prevent multiple pathways to a device), a spanning tree technique would typically look to activate one of the pathways and deactivate the other pathway. The spanning tree technique can use any of a variety of criteria to select the active pathway. On the other hand, the SMLT technique of the present invention allows the pathways from both aggregation switches to the ES to be active. All SMLT links are placed in a forwarding state, and data can be sent over all active SMLT links at all times in both directions. Among other things, this allows for load sharing between the two aggregation switches.

From the perspective of the ES, load sharing is achieved by the MLT path selection algorithm that is used to forward packets over the multiple links of the MLT. This forwarding is typically done on a MAC source/destination address basis, although this is not a requirement or limitation of the invention.

From the perspective of an AS, load sharing is achieved by sending all traffic destined for the ES directly and not over the IST trunk. The IST trunk is preferably never used for cross traffic to and from a SMLT dual-homed ES. Traffic received on the IST by an AS is preferably never forwarded on SMLT links because the other AS will have forwarded the traffic directly to the ES, thus avoiding a loop in the network.

Another advantage of the SMLT technique over a spanning tree technique is that the SMLT technique provides for very quick failure recovery. When a failure occurs in a spanning tree environment, the spanning tree must be re-calculated in order to bypass the failure. This can take many seconds, during which time data can be lost. When a failure occurs in an SMLT environment, a simple port status change in the AS effectively redirects traffic through the other AS in order to bypass the failure. This can be done very quickly in order to reduce the amount of data loss.

It should be noted that the trunk splitting technique of the present invention is in no way limited to any particular type of client device. The client device can be an edge device as described in the above embodiments, an intermediate device, or even an aggregation device for a different SMLT.

It should be noted that the term "switch" is used herein to describe a communication device that may be used in a communication system, and should not be construed to limit the present invention to any particular communication device type. Thus, a communication device may include, without limitation, a bridge, router, bridge-router (brouter), switch, node, or other communication device.

It should also be noted that the term "packet" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor within an aggregation switch under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. A method for improving communication network reliability, the method comprising: splitting a multilink trunk from a client device of a network between two aggregation devices such that each aggregation device is coupled to at least one link of the split multilink trunk; and operating the aggregation devices such that the aggregation devices appear to the client device as a single device coupled to the client device through the multilink trunk by assigning a unique identifier for the split multilink trunk and using the unique identifier by each aggregation device to identify the split multilink trunk.

2. The method of claim 1, wherein splitting a multilink trunk from a client device of a network between two aggregation devices such that each aggregation device is coupled to at least one link of the split multilink trunk comprises: coupling at least one link of the multilink trunk to each of the aggregation devices; and configuring the respective links of the multilink trunk for each aggregation device as a split multilink trunk.

3. The method of claim 2, wherein configuring the respective links of the multilink trunk for each aggregation device as a split multilink trunk comprises: configuring each port associated with the split multilink trunk as a split multilink trunk logical port type.

4. The method of claim 1, wherein operating the aggregation devices such that the aggregation devices appear to the client device as a single device coupled to the client device through the multilink trunk comprises: establishing a communication connection between the aggregation devices; and exchanging information and data packets between the aggregation devices over the communication connection using a communication connection protocol in order to operate the aggregation devices such that the aggregation devices appear to the client device as a single device coupled to the client device through the multilink trunk.

5. A method for improving communication network reliability, the method comprising: splitting a multilink trunk from a client device of a network between two aggregation devices such that each aggregation device is coupled to at least one link of the split multilink trunk: and operating the aggregation devices such that the aggregation devices appear to the client device as a single device coupled to the client device through the multilink trunk wherein operating the aggregation devices such that the aggregation devices appear to the client device as a single device coupled to the client device through the multilink trunk comprises: transmitting substantially identical bridge protocol data unit (BPDU) messages by the aggregation devices to the client device over their respective links of the split multilink trunk.

6. The method of claim 5, wherein transmitting substantially identical bridge protocol data unit (BPDU) messages by the aggregation devices to the client device over their respective links of the split multilink trunk comprises: determining a value for each of a number of BPDU message parameters; and using the determined value for each of the number of BPDU message parameters by each aggregation device.

7. The method of claim 6, wherein determining a value for each of a number of BPDU message parameters comprises: negotiating the value for at least one of the number of BPDU message parameters by the aggregation devices.

8. The method of claim 6, wherein the number of BPDU message parameters comprises a bridge identifier parameter, and wherein determining a value for the bridge identifier parameter comprises: determining a relative priority for each aggregation device; determining the higher priority aggregation device; determining a bridge identifier for the higher priority aggregation device; and determining the value for the bridge identifier parameter to be the bridge identifier for the higher priority aggregation device.

9. The method of claim 6, wherein the number of BPDU message parameters comprises a root path cost parameter, and wherein determining a value for the root path cost parameter comprises: determining a relative priority for each aggregation device; determining the higher priority aggregation device; determining a root path cost for the higher priority aggregation device; and determining the value for the root path cost parameter to be the root path cost for the higher priority aggregation device.

10. The method of claim 6, wherein the number of BPDU message parameters comprises a port identifier parameter, and wherein determining a value for the port identifier parameter comprises: determining a relative priority for each aggregation device; determining the higher priority aggregation device; determining a highest priority port identifier from among ports of the higher priority aggregation device associated with the split multilink trunk; and determining the value for the port identifier parameter to be the highest priority port identifier from among ports of the higher priority aggregation device associated with the split multilink trunk.

11. The method of claim 1, wherein operating the aggregation devices such that the aggregation devices appear to the client device as a single device coupled to the client device through the multilink trunk comprises: maintaining an address table by each aggregation device; and forwarding packets by each aggregation device based upon its respective address table.

12. The method of claim 11, wherein maintaining an address table by each aggregation device comprises: learning an address by one of the aggregation devices; maintaining the address by said one of the aggregation devices in its address table; sending the learned address by said one of the aggregation devices to the other aggregation device; and maintaining the address by the other aggregation device in its address table.

13. The method of claim 12, wherein learning an address by one of the aggregation devices comprises at least one of: learning an address of a directly connected device; and learning an address of an end device over the split multilink trunk.

14. The method of claim 11, wherein forwarding packets by each aggregation device based upon its respective address table comprises: receiving a packet by one of the aggregation devices from a device other than the other aggregation device; searching the address table for a packet destination; determining that the packet destination is unknown; and forwarding the packet to at least the other aggregation device.

15. The method of claim 14, further comprising: forwarding the packet over the split multilink trunk, provided the packet was not received over the split multilink trunk.

16. The method of claim 11, wherein forwarding packets by each aggregation device based upon its respective address table comprises: receiving a packet by one of the aggregation devices from the other aggregation device; searching the address table for a packet destination; determining that the packet destination is known; determining that the packet destination is associated with an active dual-homed split multilink trunk link; and dropping the packet without forwarding the packet over any port.

17. The method of claim 11, wherein forwarding packets by each aggregation device based upon its respective address table comprises :-receiving a packet by one of the aggregation devices from the other aggregation device; searching the address table for a packet destination; determining that the packet destination is known; determining that the packet destination is not associated with an active dual-homed split multilink trunk link; and forwarding the packet to all ports that are not associated with an active dual-homed SMLT port or with the other aggregation device.

18. The method of claim 11, wherein forwarding packets by each aggregation device based upon its respective address table comprises: receiving a packet by one of the aggregation devices from the other aggregation device; searching the address table for a packet destination; determining that the packet destination is unknown; and forwarding the packet to all ports that are not associated with an active dual-homed SMLT port or with the other aggregation device.

19. The method of claim 12, wherein maintaining an address table by each aggregation device comprises: determining that an address has been aged by at least one of the aggregation devices; and removing the aged address by each aggregation device from its respective address table.

20. The method of claim 1, wherein operating the aggregation devices such that the aggregation devices appear to the client device as a single device coupled to the client device through the multilink trunk comprises: load sharing by the aggregation devices over their respective links of the split multilink trunk.

21. The method of claim 1, wherein operating the aggregation devices such that the aggregation devices appear to the client device as a single device coupled to the client device through the multilink trunk comprises: determining by one of the aggregation devices that all links of its split multilink trunk have failed; and restoring communication between said one of the two aggregation devices and the client device through the other aggregation device.

22. The method of claim 21, wherein restoring communication between said one of the aggregation devices and the client device through the other aggregation device comprises: sending a message by said one of the aggregation devices to the other aggregation device, the message informing the other aggregation device that all links of its split multilink trunk have failed; and redirecting all affected flows from the failed split multilink trunk to the other aggregation device.

23. The method of claim 22, wherein redirecting all affected flows from the failed split multilink trunk to the other aggregation device comprises: changing the status of all ports associated with the failed split multilink trunk.

24. The method of claim 22, wherein restoring communication between said one of the aggregation devices and the client device through the other aggregation device further comprises: receiving said message by said other aggregation device; and reconfiguring the links of the split multilink trunk for said other aggregation device from a split multilink trunk to a multilink trunk.

25. The method of claim 24, wherein reconfiguring the links of the split multilink trunk for said other aggregation device from a split multilink trunk to a multilink trunk comprises: configuring each port associated with the split multilink trunk from a split multilink trunk logical port type to a multilink trunk logical port type.

26. The method of claim 4, wherein the communication connection protocol comprises at least one of: a hello message that is used to verify connectivity between the aggregation devices; a notification of learned or migrated MAC addresses message that is used to exchange learned or migrated MAC addresses between the aggregation devices; and a notification of aged address message that is used to exchange address aging information for addresses associated with the split multilink trunk between the aggregation devices.

27. An apparatus for operating as an aggregation device in a communication network having a multilink trunk that is split between two aggregation devices, the apparatus comprising: at least one inter-device communication port for communicating with the other aggregation device using a communication connection protocol; at least one split multilink trunk communication port for communicating with a client device over at least one link of a multilink trunk from the client device that is split between the aggregation devices; and aggregation logic operably coupled to operate in conjunction with other aggregation device so that the aggregation devices appear to the client device as a single device coupled to the client device through the multilink trunk wherein the aggregation logic is operably coupled to maintain a unique identifier for the split multilink trunk and to use the unique identifier to identify the split multilink trunk.

28. The apparatus of claim 27, wherein the aggregation logic is operably coupled to configure each port associated with its split multilink trunk as a split multilink trunk logical port type.

29. The apparatus of claim 27, wherein the aggregation logic is operably coupled to exchange information and data packets with the other aggregation device over the inter-device communication port using the communication connection protocol.

30. An apparatus for operating as an aggregation device in a communication network having a multilink trunk that is split between two aggregation devices, the apparatus comprising: at least one inter-device communication port for communicating with the other aggregation device using a communication connection protocol at least one split multilink trunk communication port for communicating with a client device over at least one link of a multilink trunk from the client device that is split between the aggregation devices; and aggregation logic operably coupled to operate in conjunction with other aggregation device so that the aggregation devices appear to the client device as a single device coupled to the client device through the multilink trunk wherein the aggregation logic is operably coupled to negotiate with the other aggregation device to determine values for each of a number of bridge protocol data unit (BPDU) parameters and to transmit substantially identical bridge protocol data unit (BPDU) messages as the other aggregation device to the client device over its links of the split multilink trunk.

31. The apparatus of claim 30, wherein the number of BPDU message parameters comprises a bridge identifier parameter, and wherein the aggregation logic is operably coupled to determine a relative priority for each aggregation device, determine the higher priority aggregation device, determine a bridge identifier for the higher priority aggregation device, and determine the value for the bridge identifier parameter to be the bridge identifier for the higher priority aggregation device.

32. The apparatus of claim 30, wherein the number of BPDU message parameters comprises a root path cost parameter, and wherein the aggregation logic is operably coupled to determine a relative priority for each aggregation device, determine the higher priority aggregation device, determine a root path cost for the higher priority aggregation device, and determine the value for the root path cost parameter to be the root path cost for the higher priority aggregation device.

33. The apparatus of claim 30, wherein the number of BPDU message parameters comprises a port identifier parameter, and wherein the aggregation logic is operably coupled to determine a relative priority for each aggregation device, determine the higher priority aggregation device, determine a highest priority port identifier from among ports of the higher priority aggregation device associated with the split multilink trunk, and determine the value for the port identifier parameter to be the highest priority port identifier from among ports of the higher priority aggregation device associated with the split multilink trunk.

34. The apparatus of claim 27, wherein the aggregation logic is operably coupled to maintain an address table and forward packets based upon the address table.

35. The apparatus of claim 34, wherein the aggregation logic is operably coupled to learn an address, maintain the address in its address table, and send the learned address to the other aggregation device over the inter-device communication port.

36. The apparatus of claim 34, wherein the aggregation logic is operably coupled to receive a packet from a device other than the other aggregation device, search the address table for a packet destination, determine that the packet destination is unknown, and forward the packet to at least the other aggregation device over the inter-device communication port.

37. The apparatus of claim 36, wherein the aggregation logic is operably coupled to forward the packet to the client device over the split multilink trunk, provided the packet was not received over the split multilink trunk.

38. The apparatus of claim 34, wherein the aggregation logic is operably coupled to receive a packet from the other aggregation device over the inter-device communication port, search the address table for a packet destination, determine that the packet destination is known, determine that the packet destination is associated with an active dual-homed split multilink trunk, and drop the packet without forwarding the packet over any port.

39. The apparatus of claim 34, wherein the aggregation logic is operably coupled to receive a packet from the other aggregation device over the inter-device communication port, search the address table for a packet destination, determine that the packet destination is unknown, and forward the packet to all ports that are not associated with an active dual-homed SMLT port or with the other aggregation device.

40. The apparatus of claim 34, wherein the aggregation logic is operably coupled to determine that an address has been aged by at least one aggregation device and to remove the address from its address table.

41. The apparatus of claim 40, wherein the aggregation logic is operably coupled to determine that the address has been aged locally and to send a message to the other aggregation device over the inter-device communication port indicating that the address has been aged locally.

42. The apparatus of claim 40, wherein the aggregation logic is operably coupled to receive a message from the other aggregation device over the inter-device communication port indicating that the address has been aged by the other aggregation device.

43. The apparatus of claim 27, wherein the aggregation logic is operably coupled to determine that all links of its split multilink trunk have failed, send a message to the other aggregation device over the inter-device communication port informing the other aggregation device that all links of its split multilink trunk have failed, and redirecting all affected flows from the failed split multilink trunk to the inter-device communication port so that all packets previously destined for its split multilink trunk are forwarded to the other aggregation device over the inter-device communication port.

44. The apparatus of claim 27, wherein the aggregation logic is operably coupled to receive a message from the other aggregation device indicating a split multilink trunk failure and to reconfigures each port associated with the split multilink trunk from a split multilink trunk logical port type to a multilink trunk logical port type.

45. The apparatus of claim 27, wherein the communication connection protocol comprises at least one of: a hello message that is used to verify connectivity between the aggregation devices; a notification of learned or migrated MAC addresses message that is used to exchange learned or migrated MAC addresses between the aggregation devices; and a notification of split multilink trunk address age expired message that is used to exchange address aging information for addresses associated with the split multilink trunk between the aggregation devices.

46. The apparatus of claim 34, wherein the aggregation logic is operably coupled to receive a packet from the other aggregation device over the inter-device communication port, search the address table for a packet destination, determine that the packet destination is known, determine that the packet destination is not associated with an active dual-homed split multilink trunk link, and forward the packet to all ports that are not associated with an active dual-homed SMLT port or with the other aggregation device.

47. A system comprising a client device coupled to two aggregation devices over a multilink trunk that is split between the aggregation devices, wherein the aggregation devices are operably coupled to work in conjunction such that the aggregation devices appear to the client device as a single device coupled to the client device through the multilink trunks by associating a unique identifier for the split multilink trunk and to using the unique identifier to identify the split multilink trunk.

\* \* \* \* \*

UNITED STATES PATENT AND TRADEMARK OFFICE
CERTIFICATE OF CORRECTION

| | |
|---|---|
| PATENT NO. | : 7,173,934 B2 |
| APPLICATION NO. | : 10/125654 |
| DATED | : February 6, 2007 |
| INVENTOR(S) | : Lapuh et al. |

Page 1 of 1

It is certified that error appears in the above-identified patent and that said Letters Patent is hereby corrected as shown below:

At Column 16, line 50, should read; least one link of the split multilink trunk ÷ ; and

At Column 19, line 51, should read; communication protection protocol; at least one At Column 21, line 25, should read; failure to ~~reconfigures~~ reconfigure each port At Column 22, line 25, should read; multilink ~~trunks~~ trunk by associating Signed and Sealed this Twenty-sixth Day of June, 2007

JON W. DUDAS
*Director of the United States Patent and Trademark Office*